Feb. 24, 1970  R. J. MISTARZ  3,496,776
PRESSURE GAUGE
Filed May 3, 1968
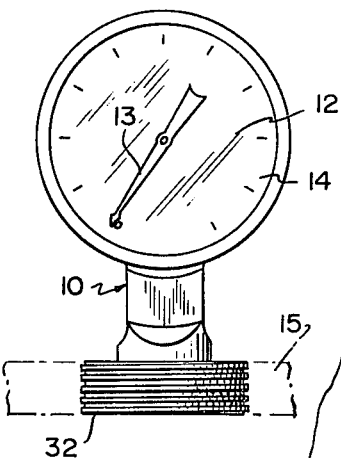
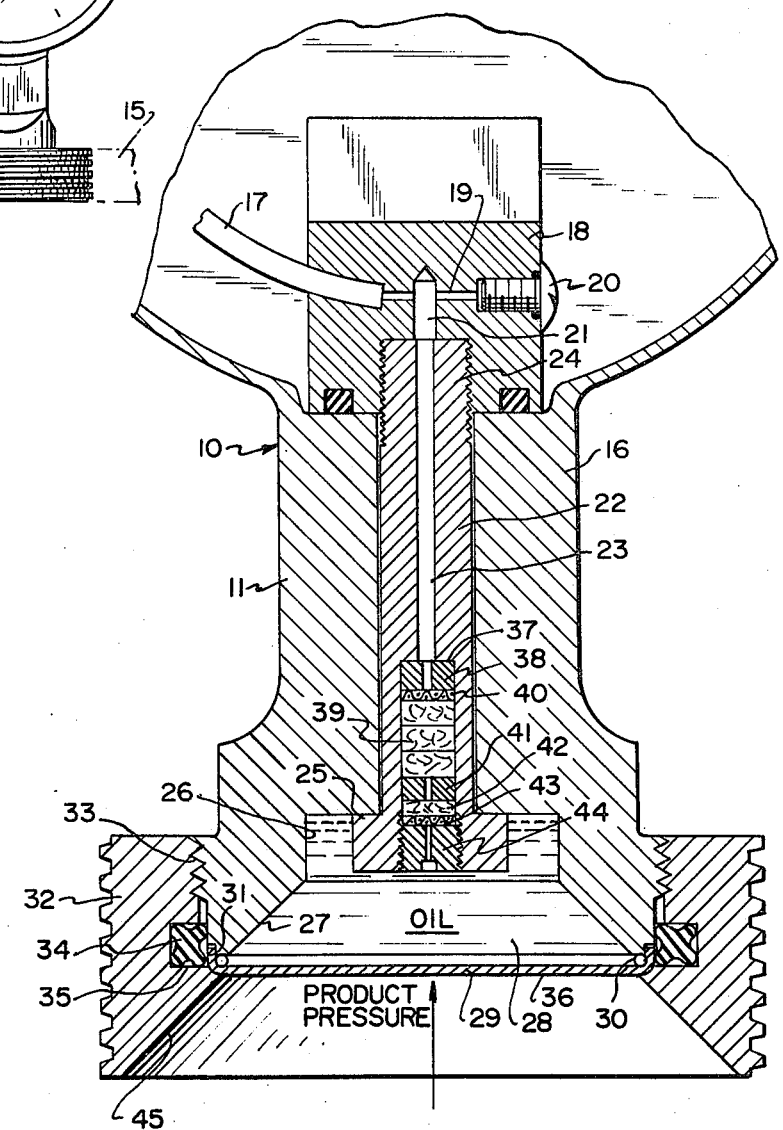
INVENTOR.
ROBERT J. MISTARZ
BY *Hofgren, Wegner, Allen, Stellman & McCord*
ATTORNEYS.

United States Patent Office 3,496,776
Patented Feb. 24, 1970

3,496,776
PRESSURE GAUGE
Robert J. Mistarz, Northbrook, Ill., assignor to Chicago Stainless Equipment, a corporation of Illinois
Filed May 3, 1968, Ser. No. 726,489
Int. Cl. G01l 7/08
U.S. Cl. 73—392                                                 1 Claim

ABSTRACT OF THE DISCLOSURE

A gauge that is particularly useful for maintaining the sanitary conditions of a variable pressure material such as a food material, specifically milk, in which the gauge comprises pressure movable parts for indicating the pressure of the material and a pressure responsive member isolating the material such as the food material from the movable parts by having one side of the member exposed to the variable pressure material and the other side isolated from this material but exposed to the pressure movable parts of the gauge. In a specific instance this pressure responsive member is preferably a thin diaphragm having the edges sealed so that only the one side is subjected to the variable pressure material which may be a flowable food material such as milk.

---

One of the features of this invention is to provide a pressure gauge that comprises a gauge body, a pressure responsive member such as a flexible diaphragm and a fitting for retaining the member on the body with one side of the member exposed to the material whose pressure is to be indicated by the gauge and the opposite side isolated from this material but exposed to the pressure movable parts of the gauge so that varying pressures in the material will act through the responsive member to indicate pressure changes.

Other features and advantages of the invention will be apparent from the following description of one embodiment thereof taken in conjunction with the accompanying drawings. Of the drawings:

FIGURE 1 is a front elevational view of a gauge embodying the invention with adjacent portions of a container in which the variable pressure material is held being indicated by broken lines.

FIGURE 2 is an enlarged vertical sectional view through the lower portion of the gauge of FIGURE 1.

In the illustrated embodiment the gauge 10 comprises a body 11 including the usual dial 12 and movable pointer 13 arranged against a scale 14 for indicating changes in pressure within a container 15 of variable pressure material (not shown) such as a liquid.

The body 11 comprises a stem 16 on which the dial 12 is mounted. The gauge in the illustrated embodiment is of the standard Bourdon type and therefore includes a curved flexible pressure tube of the usual type which when subjected to increasing internal pressure tends to change its curvature and thereby move the pointer 13.

The inlet end of the tube 17 is held in a base 18 provided with a transverse passage 19 communicating at one end with the tube 17 and closed at the other end by a sealing screw 20. The transverse passage 19 communicates with an intersecting axial flow passage 21 in the customary way.

The base 18 is held in position by an attachment screw 22 having a longitudinal bore 23 communicating at the threaded end 24 of the screw with the axial flow passage 21. The screw 22 has an enlarged head 25 at the end opposite the threaded end 24 with this screw head 25 being positioned within a hollowed out section in the base of the body 11. This section 26 merges into an outwardly flared bottom section 27 so that the two sections 26 and 27 combine to form an oil reservoir 28 containing a quantity of ordinary gauge oil.

The bottom of the reservoir 28 is defined by a pressure responsive member 29 here illustrated as a thin metal diaphragm. This diaphragm which is generally circular is sealed to the bottom of the gauge body 11 both by a metal-to-metal seal and by a circular O-ring gasket 30 that is located at the bend of an annular edge flange 31 on the diaphragm.

The diaphragm 29 is retained in sealing engagement with the bottom of the gauge body 11 and with the gasket 30 by means of a threaded adapter 32 that is releasably attached to the bottom of the gauge body 11 around the edge 31 of the diaphragm. As shown, this attachment of the adapter to the gauge body is secured by means of a threaded connection illustrated at 33.

In order to provide a further seal between the adapter 32 and the gauge body 11 and the adapter and the edge 31 of the diaphragm 29 there is provided a second annular gasket 34 located in an annular recess 35 in the adapter 32. This gasket 34 is of a commercial type and has one portion bearing against the outer surface of the diaphragm edge flange 31, another portion bearing against the body 11 immediately above this edge flange and other portions bearing against the internal surfaces of the recess 35 with all these bearing contacts forming fluid seals.

The attachment screw bore 23 through which the liquid flows from the reservoir 28 into the gauge tube 17 with increasing pressure on the outer surface 36 of the diaphragm 29 is provided with dampening means so that there is substantially no oscillating of the pointer 13 under changing pressure conditions within the container 15. This dampening means as illustrated is located within an internal chamber 37 at the bottom of the attachment screw 22 and communicating with the bore 23. The dampening means comprises an orifice plug 38 at the innermost end of the chamber 37, next a screen 39, a series of felt flow dampening plugs 40, then a second orifice plug 41, another felt plug 42, then an opposite end screen 43 and beneath that a threaded adjustable orifice plug 44. The end orifice plug 44 is threaded into the attachment screw 22 in order that the force of compression on the felt plugs can be adjusted to a desired value. The compressive force on these plugs of course determines the rate of flow through the bore 23 including the compressed felt plugs.

As can be seen from the above description, the gauge of this invention is ideally suited for sanitary or hygienic uses as the diaphragm 29 which transmits pressure to indicating portions of the gauge also isolates the pressure movable parts of the gauge from the material whose pressure is being indicated. Furthermore, the material only contacts the outer one side 36 of the diaphragm and in the illustrated embodiment the inner or one surface 45 of the adapter 32. These surfaces are of course easily cleaned and provide no cracks upon which the material may gather. This is very important when the material is a food material such as milk. Furthermore, the diaphragm 29 is preferably of thin metal, is quite inexpensive and is easily replaced when necessary by merely unscrewing the adapter 32 from its threaded connection to the gauge body 11. In order to avoid contaminating the material whose pressure is being indicated the pressure responsive member, here shown as the diaphragm 29, and the adapter 32 particularly at the material contacting surfaces are preferably made of a non-staining construction material such as stainless steel. Thus, in this arrangement the moving parts of the gauge do not have to be sanitary as they are not contacted by the material itself but are isolated therefrom by the diaphragm 29 and in this embodiment by the adapter 32.

Another very important advantage of this gauge is that the gauge body 11 and the diaphragm 29 may each be made to a standard size and the proper outer diameter adapter 32 selected to fit the opening in the particular container 15.

Having described my invention as related to the embodiment shown in the accompanying drawings, it is my intention that the invention be not limited by any of the details of description, unless otherwise specified, but rather be construed broadly within its spirit and scope.

I claim:

1. A gauge having pressure movable parts for indicating pressure of a variable pressure material, comprising: a gauge body; a pressure responsive member having a pair of opposite sides for exposure of one said side to said material and of the other said side to said pressure movable parts; and fitting means for retaining said member on said body with said one side exposed to said material and said other side isolated from said material but exposed to said parts, said fitting means comprising an annular adapter on said body surrounding said pressure responsive member and having attaching threads on its outer surface for attaching to a container, said pressure responsive member comprising a flexible diaphragm having an edge portion, and said adapter retains said edge portion between said body and adapter; said pressure movable parts comprising a liquid reservoir means on said other side and liquid flow conduit means leading therefrom, and flow restricting dampening means in said conduit means comprising, in series from said operating parts toward said diaphragm, an orifice member, a screen, a plurality of compressed fibrous plugs, another orifice member, another compressed fibrous plug, another screen, and a final orifice member.

References Cited

UNITED STATES PATENTS

| 324,251 | 8/1885 | Hartwell | 73—406 |
| 2,244,335 | 6/1941 | Hopkins | 73—411 XR |
| 2,486,133 | 10/1949 | Egger | 73—392 XR |
| 3,347,272 | 10/1967 | Rast | 73—392 XR |

DONALD O. WOODIEL, Primary Examiner

U.S. Cl. X.R.

73—406